United States Patent [19]

Matsumoto et al.

[11] Patent Number: 4,546,386

[45] Date of Patent: Oct. 8, 1985

[54] ADAPTIVE PREDICTIVE CODING SYSTEM FOR TELEVISION SIGNALS

[75] Inventors: Shuichi Matsumoto, Ichigayata; Yoshinori Hatori, Kawasaki; Hitomi Murakami, Yokohama; Hideo Yamamoto, Sagamihara, all of Japan

[73] Assignee: Kokusai Denshin Denwa Kabushiki Kaisha, Tokyo, Japan

[21] Appl. No.: 460,293

[22] Filed: Jan. 24, 1983

[30] Foreign Application Priority Data

Jan. 25, 1982 [JP] Japan .................................... 57-8825

[51] Int. Cl.⁴ ............................................ H04N 7/12
[52] U.S. Cl. ..................................... 358/136; 358/105
[58] Field of Search ................ 358/133, 105, 136, 138

[56] References Cited

U.S. PATENT DOCUMENTS

| | | | |
|---|---|---|---|
| 4,307,420 | 12/1981 | Ninomiya et al. | 353/136 |
| 4,403,250 | 9/1983 | Kellar | 358/105 |
| 4,437,119 | 3/1984 | Matsumoto et al. | 358/136 |
| 4,460,923 | 7/1984 | Hirano et al. | 358/136 |

Primary Examiner—John C. Martin
Assistant Examiner—Edward L. Coles
Attorney, Agent, or Firm—Robert E. Burns; Emmanuel J. Lobato; Bruce L. Adams

[57] ABSTRACT

An adaptive predictive coding system for television signals, in which noting the movement of a picture, adopts the inter-frame prediction value in a case of the picture being decided to be a still picture and, in other cases, compares the inter-frame, into-field and intra-field prediction values with each other in terms of magnitude taking into account the quantity of movement of the picture and adopts the prediction value which would not make the coding efficiency the worst, spo that a stable and high coding efficiency can be achieved.

2 Claims, 7 Drawing Figures

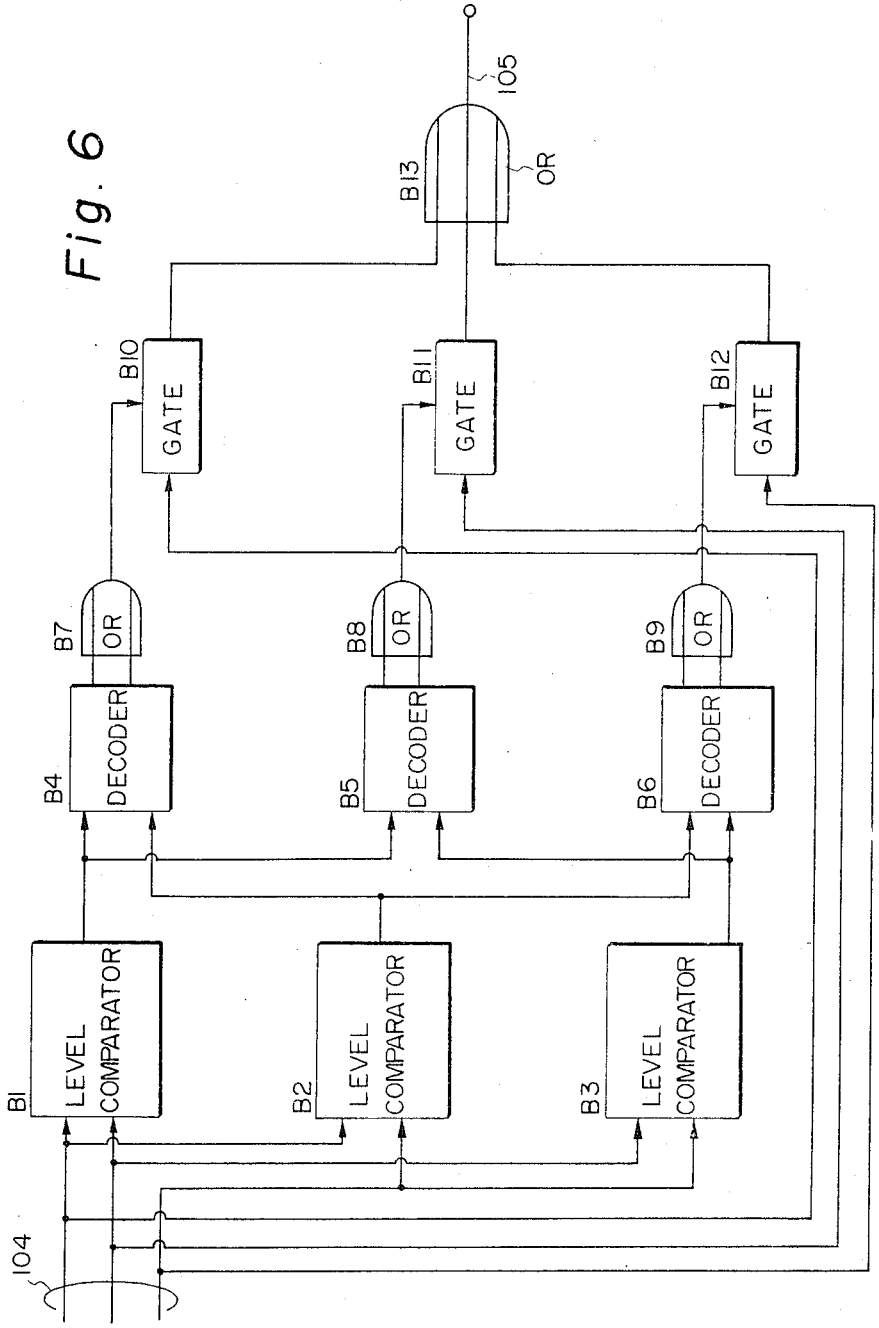

ical relation-
ships of respective picture elements, explanatory of the
prior art coding systems. Now, since the sampling fre-
quency is selected to be an integer multiple of the hori-
zontal scanning frequency, the picture elements are
arranged in the form of a grid and, because of the inter-
laced scanning, lines of the immediately preceding field
lie between scanning lines of the current field, and the
lines of a field immediately preceding the preceding
field and the current field assume the same positions. In
FIG. 1, a picture element 2 lies on the left side of a
current picture element 1 next thereto on the same line;
picture elements 9 and 10 lie just above the picture
elements 1 and 2, respectively, on a line two lines above
in the same field; a picture element 5 lies just above the
picture element 1 on a line one line above in the same
field; picture elements 12 and 13 lie just below the pic-
ture elements 1 and 2, respectively, on a line one line
below in the immediately preceding field; and picture
elements 23 and 26 occupy the same positions as the
picture elements 1 and 5, respectively, in two fields
before.

In this case, it is considered that sample values of
some closely spaced picture elements have high correla-
tion and, therefore, in the conventional intra-field pre-
dictive coding system (see Japanese patent application
No. 196000/76), a prediction value $\overline{X}_1$ of a sample value
$X_1$ of the picture element 1 in FIG. 1 is obtained in the
following form through using sample values of the ad-
joining picture elements:

$$\overline{X}_1 = \tfrac{3}{4}X_2 + X_9 - \tfrac{3}{4}X_{10} \tag{1}$$

and a difference between this prediction value $\overline{X}_1$ and
the true value $X_1$ $$O_x = X_1 - \overline{X}_1 \tag{2}$$

is regarded as a prediction error. By quantizing and
coding this, high efficiency coding can be achieved
with a small number of bits needed to be transmitted.
This is the intra-field predictive coding heretofore em-
ployed. Incidentally, although in the above the predic-
tion value is produced using the values of the picture
elements 2, 9 and 10, it is also possible to carry into
practice the intra-field coding system which produces
the prediction value $\overline{X}_1$ using other picture elements in
the same field.

According to the prior art inter-field predictive cod-
ing system (see Japanese patent application No.
19599/76), the following prediction value $\overline{X}_1$ of the
picture element 1

$$\overline{X}_1 = \tfrac{3}{4}X_2 + X_{12} - \tfrac{3}{4}X_{13} \tag{3}$$

is obtained using sample values of the picture elements
12 and 13 situated just below the picture elements 1 and
2, respectively, on a line one line below in the field
immediately preceding the field of the picture element 2
in FIG. 1, and a difference between the prediction value
and the true value is quantized as in the case of the intra-field coding system, thereby effecting high efficiency coding. In this case, it is also possible to employ other picture elements in the immediately preceding field as is the case with the intra-field coding.

The inter-frame predictive coding is a system in which the following prediction value $\bar{X}_1$ of the picture element 1

$$X_1 = -X_5 + X_{23} + X_{26} \tag{4}$$

is produced using the sample values of the picture elements 23 and 26 assuming the same positions as the picture elements 1 and 5 in a field two fields ahead of them is FIG. 5, and a difference between the prediction value and the true value is quantized as is the case with the intra-field predictive coding, thereby to perform high efficiency coding. In this case, it is also possible to employ other picture elements in the pre-previous field.

Of the above-described coding systems, the inter-frame predictive coding system exhibits a high coding efficiency for a still picture because the picture element values $X_1$ and $X_5$ and those $X_{23}$ and $X_{26}$ correspond to neighboring sample values in the picture frame and hence have high correlation. In case of a moving picture, however, the correlation between the points 1 and 5 and the points 23 and 26 decreases by a value corresponding to the movement of the picture in one frame period (1/30 sec), resulting in impaired coding efficiency for the moving picture.

In the inter-field predictive coding of a still picture, the picture element values $X_1$ and $X_2$ and those $X_{12}$ and $X_{13}$ correspond to sample values at their closely spaced positions in the picture, and hence they have high correlation, providing for high coding efficiency. Since their correlation is not so high as that between the picture element values $X_5$, $X_{23}$ and $X_{26}$ and the picture element value $X_1$ in the inter-frame predictive coding, the coding efficiency is not so high as is obtainable with the inter-frame predictive coding. In case of a moving picture, the relations between the picture elements 1 and 2 and those 12 and 13 are defined by the movement of the picture in one field period (1/60 sec) and, accordingly, their correlation decreases correspondingly, impairing the coding efficiency. However, the coding efficiency is not so much cut down as in the case of the inter-frame predictive coding.

With the intra-field predictive coding, the coding efficiency for a still picture cannot be raised so high as in the cases of the inter-field and inter-frame coding but, on the other hand, in the case of a moving picture, resolution of the picture is lowered by the integration effect of a TV camera and, consequently, the correlation of picture elements rises by that, so that the coding effect can be expected to increase.

Although the intra-field, inter-field and inter-frame predictive coding systems have such features as described above, it has been impossible with any one of them to implement coding apparatus which exhibits a high coding efficiency equally for both still and moving pictures because the inter-frame predictive coding is low in the coding efficiency for the moving picture, because the inter-field predictive coding is insufficient in the coding efficiency for both the moving and still picture, and because the inter-field predictive coding is low in the coding efficiency for the still picture.

In view of the above, the following two methods have been proposed in conventional arts.

One of them is a system which employs the inter-frame predictive coding or the inter-field predictive coding mainly for the still picture and the intra-field predictive coding or the inter-field predictive coding mainly for the moving picture, thereby to obtain a stable coding efficiency (see Japanese patent application No. 13327/81). This system is one that performs predictive coding by arranging prediction values from each of inter-frame, inter-field and intra-field predicting sections in an ascending order and then selecting a second prediction value corresponding to the magnitude of the median. With this system, the prediction efficiency obtainable with the selected prediction value is higher than that obtainable with the other unselected prediction values but it is second in terms of order. Accordingly, if high prediction efficiency can be obtained locally from at least two of three prediction functions, either one of them is selected by this system and high prediction efficiency can be expected. Furthermore, prediction select information need not be transmitted to the receiving side and the same algorithm can be implemented on both the transmitting side and the receiving side, so that fine adaptive control can be achieved for each picture element. With this system, however, in the case of the still picture, the coding efficiency decreases as compared with that obtainable with the inter-frame coding system and, in respect of a slow-moving image, the coding efficiency obtainable with each of the inter-frame, inter-field and intra-field predictive coding systems, resulting in the failure to obtain high coding efficiency.

In contrast thereto, the other method is to detect a local movement of an image between frames so as to improve the coding efficiency of the inter-frame prediction of a picture. That is to say, if the field of a television picture frame is divided into blocks, each including $m \times n$ picture elements, then the movement of the image if seen locally in these blocks can be regarded as substantially parallel. Accordingly, assuming that an image moves to right by a picture elements per frame as shown in FIG. 2, the prediction efficiency can be improved by letting a prediction value Zij of a picture element Zij be $Z = Y_{i-a,j}$ as compared with the prediction efficiency obtainable with the conventional inter-frame predictive coding system which uses $Zij = Y_{ij}$. With this method, however, since information indicative of a local movement of the image must be transmitted to the receiving side for each block independently of prediction error information, an attempt to reduce the block size and follow up a complex movement of the image as well increases the rate of the movement information to the transmission rate, thus cutting down the coding efficiency equivalently. Moreover, this method has a defect that a complex or rapid movement of the image cannot correctly be detected, resulting in the picture quality being subjected to a visually noticeable deterioration.

In view of the above, the present invention will hereinafter be described in detail.

DESCRIPTION OF THE PREFERRED EMBODIMENTS

Figure 1:
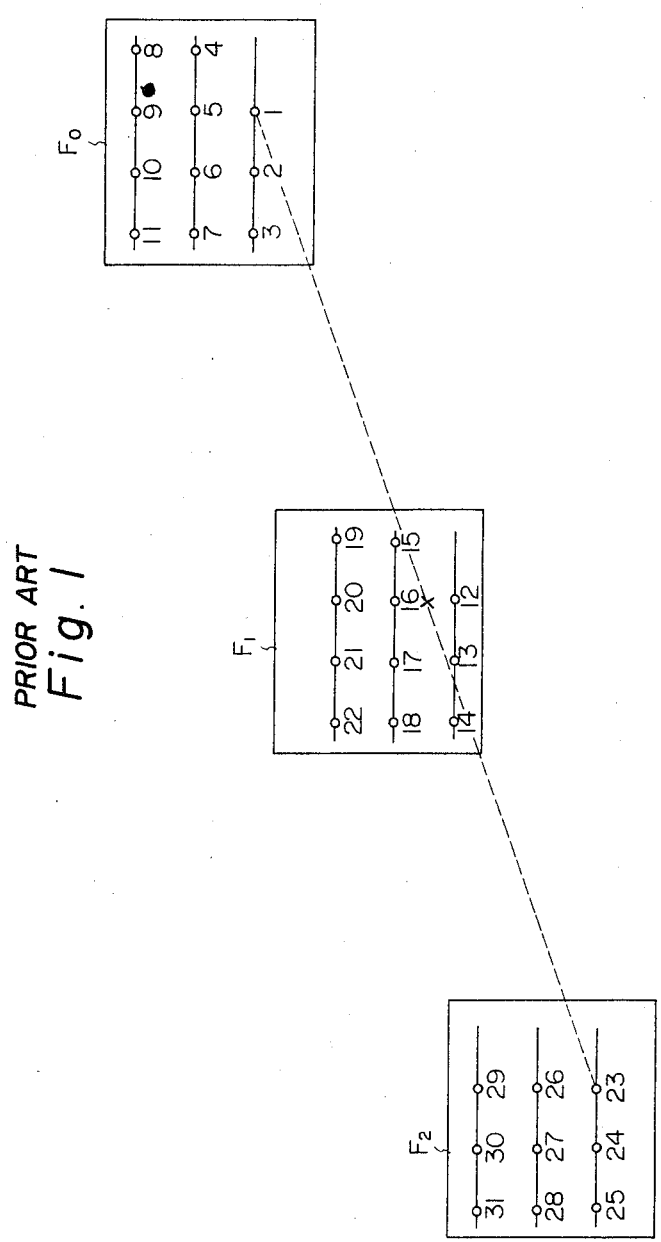
Figure 2:
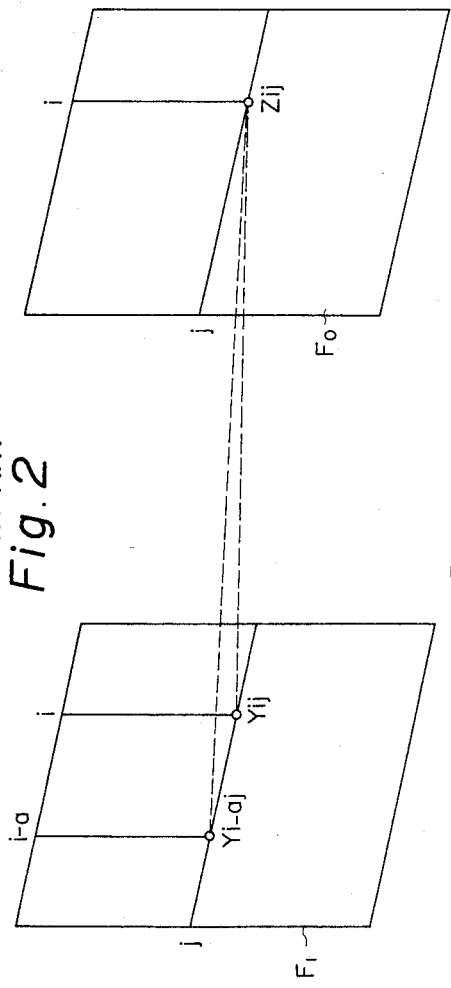
Figure 3:
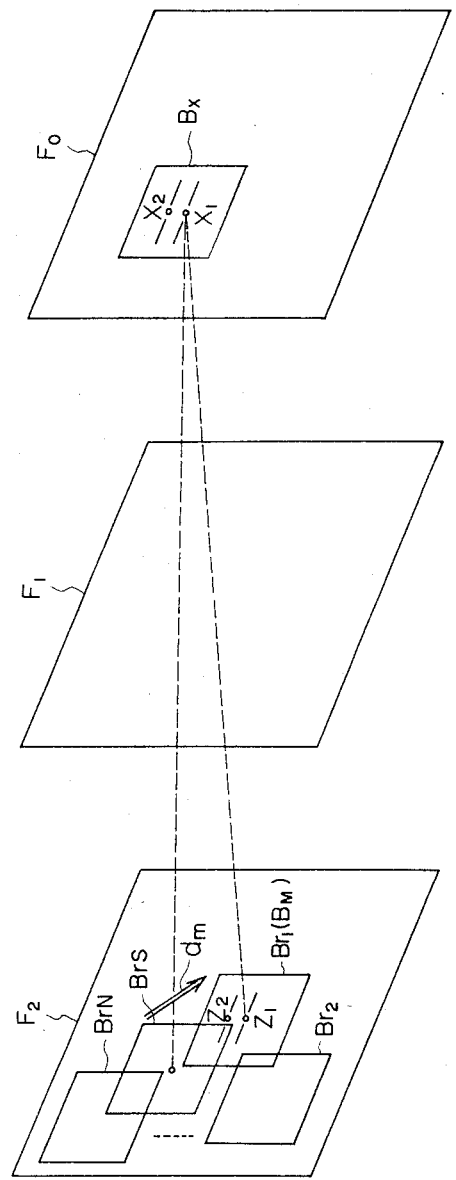

According to the present invention, as shown in FIG. 3, a standard block $B_s$, which is of the same shape as a block $B_x$ in a current field $F_0$ composed of a plurality of picture elements and to be coded, is set at first in a field $F_2$ before the preceding field $F_1$ (i.e. one frame ahead of the current field $F_0$) at a position spatially corresponding to the block $B_x$. Then a most approximate block $B_M$, each picture element of which bears the closest resemblance in luminance to each picture element of the block $B_x$ to be coded, is selected, for instance, by calculating the sum of absolute values of inter-frame difference signals for block, from a group consisting of the standard block $B_s$ and reference blocks $B_{r1}$, $B_{r2}$, ... $B_{rN}$ obtained by moving the standard block $B_s$ by at least one picture element in vertical and horizontal directions in the field $F_2$. The block in respect of which the value of this sum is smaller than those for any other blocks is the most approximate block $B_M$.

A prediction is made for each picture element of the block $B_x$ to be coded and, if the most approximate block $B_M$ is the standard block $B_s$, then the inter-frame prediction takes place; and, if any one of the reference blocks $B_{r1}$, $B_{r2}$, ... $B_{rN}$ is the most approximate block $B_M$, then prediction values available from inter-frame, inter-field and intra-field predicting sections are compared in magnitude, and a prediction value corresponding to the median is selected.

The inter-frame prediction value is produced using picture elements of the most approximate block $B_M$ and the current field $F_0$. For example, it is under consideration to predict a picture element $X_1$ in the block $B_x$ on the assumption that the most approximate block $B_M$ for the block $B_x$ shown in FIG. 3 is the reference block $B_{r1}$. In this case, an inter-frame prediction value $\overline{X}_{F1}$ of the picture element $X_1$ is produced in the following form through using a picture element $X_2$ lying on a line one line above the picture element $X_1$ in the current field $F_0$, a picture element $Z_1$ lying at the position corresponding to the picture element $X_1$ in the most approximate block $B_M$ and a picture element $Z_2$ lying on a line one line above the picture element $Z_1$.

$$X_{F1} = -X_2 + Z_1 - Z_2 \tag{5}$$

Incidentally, it is also possible to use the picture element $Z_1$ in the most approximate block $B_M$ as the inter-frame prediction value $\overline{X}_{F1}$.

An intra-field prediction value $\overline{X}_{N1}$ and an inter-field prediction value $\overline{X}_{K1}$ are produced by the same method as the aforementioned conventional one through using picture elements adjoining the picture element $X_1$ in the same field or picture elements in the field $F_1$ immediately preceding the current field $F_0$. Now, in a case where the most approximate block $B_M$ is the reference block $B_{r1}$, the inter-frame prediction value $\overline{X}_{F1}$, the inter-field prediction value $\overline{X}_{K1}$ and the intra-field prediction value $\overline{X}_{N1}$ are compared in magnitude with one another so that the value corresponding to the median is selected as the prediction value of the picture element $X_1$. For instance, if $\overline{X}_{F1} < \overline{X}_{K1} < \overline{X}_{N1}$, the inter-field prediction value is selected as the prediction value of the picture element $X_1$.

In general, the adaptive predictive coding of television signals is carried out by a method of determining a prediction value on the basis of the feature quantity of an image signal or a method of selecting, apparently without depending on the feature quantity, a prediction value appropriate to local properties of the image signal as it turns out.

With the former system, if the feature quantity of the image signal can be accurately detected, a very high coding efficiency can be obtained. In contrast thereto, according to the latter system, a stable coding efficiency can be obtained regardless of the feature quantity of the image signal. However, it cannot be expected to be so high as would be obtainable with the former system when the feature quantity could be detected with accuracy.

Accordingly, a higher coding efficiency can be achieved by an appropriate combination of these systems, that is, by using the former in a case where the feature quantity could accurately be detected and by using the latter if not so.

The present invention, noting the movement of a picture as this feature quantity, adopts the inter-frame prediction value in a case of the picture being decided to be a still picture and, in other cases, compares the inter-frame, inter-field and intra-field prediction values with each other in terms of magnitude taking into account the quantity of movement $d_m$ of the picture and adopts the prediction value which would not make the coding efficiency the worst; therefore, a stable and high coding efficiency can be achieved. Furthermore, since there is no need of transmitting any special prediction value select information other than movement information for each block, elaborate adaptive control can be effected, permitting improvement of the picture quality.

Figure 4:
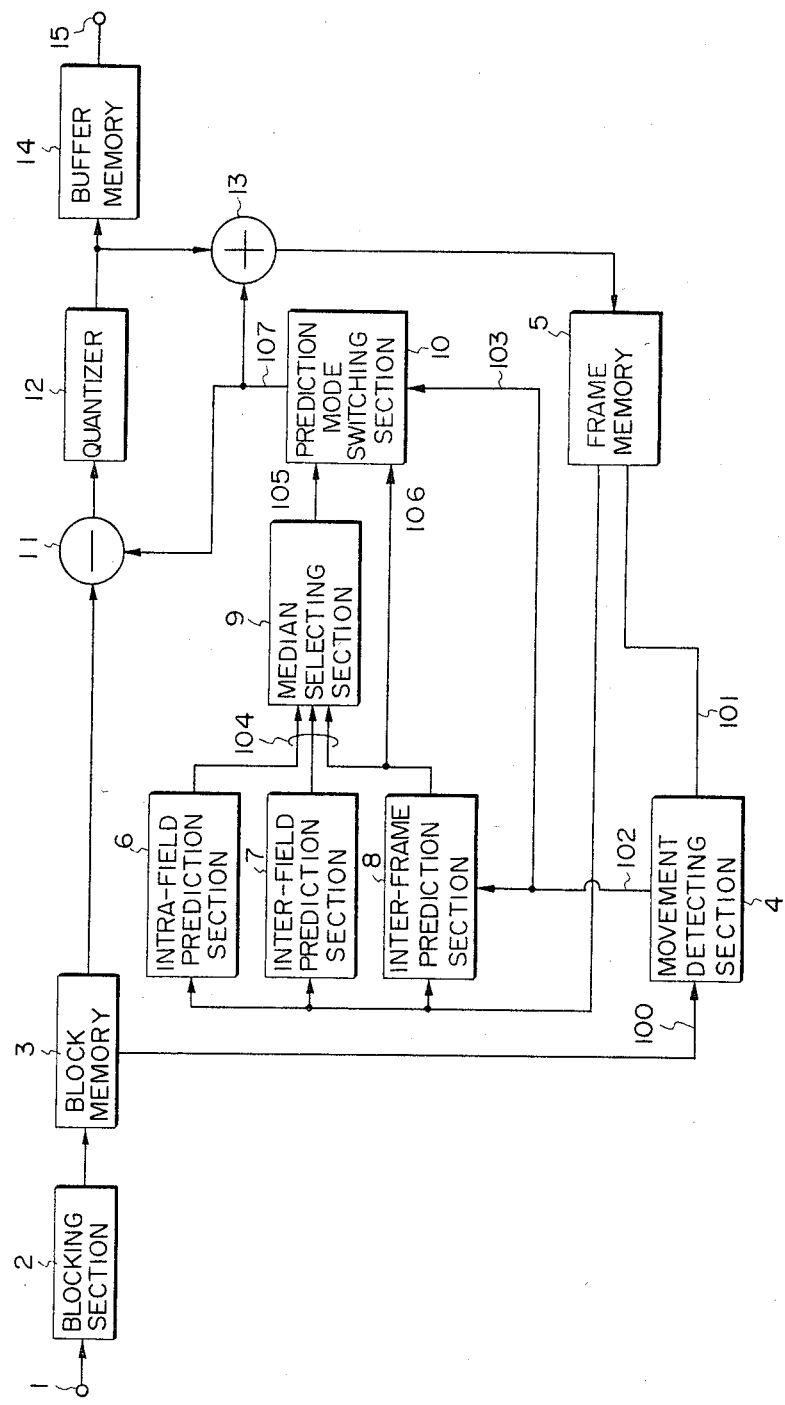

FIG. 4 illustrates an embodiment of the present invention. Reference numeral 1 indicates a signal input terminal; 2 designates a blocking section; 3 identifies a block memory; 4 denotes a movement detecting section; 5 represents a frame memory; 6 shows an intra-field predicting section; 7 refers to an inter-field predicting section; 8 signifies an inter-frame predicting section; 9 indicates a median selecting section; 10 designates a prediction mode switching section; 11 identifies a subtractor; 12 denotes a quantizer; 13 represents an adder; 14 shows a buffer memory; and 15 refers to a signal output terminal.

A digitized television signal is applied first from the signal input terminal 1. In the blocking section 2, blocks each consisting of (m×n) picture elements are produced from the input signal, and they are stored in the block memory 3 until a most approximate block is detected. The movement detecting section 4 detects the most approximate block on the base of the output from the block memory 3 and picture element values of a field $F_2$ of the immediately preceding frame stored in the frame memory 5. The intra-field predicting section 6 and the inter-field predicting section 7 respectively produce prediction values for picture element values stored in the block memory 3 on the base of picture element values of a current and a previous field stored in the frame memory 5. The inter-frame predicting section 8 reads out, on the basis of information on the position of the most approximate block detected by the movement detecting section 4, picture element values in the most approximate block of the field $F_2$ and picture element values of the current field stored in the frame memory 5, and produces a prediction value for each picture element value stored in the block memory 3. The median selecting section 9 compares, in terms of magnitude, the prediction values derived from the intra-field predicting section 6, the inter-field predicting section 7 and the inter-frame predicting section 8 with one another, so that selects the prediction value corresponding to the median. The prediction mode switching section 10 selects, on the basis of the positional information of the most approximate block detected by the movement detecting section 4, the prediction value from the inter-frame predicting section 8 or the median selecting section 9 depending on whether the above-said information is indicative of a standard block or a reference block. The prediction value thus selected is subtracted by the subtractor 11 from each element value obtained from the block memory 3, and the result of the subtraction is quantized by the quantizer 12. The quantized output is locally decoded by its addition to the prediction value from the prediction mode switching section 10 in the adder 13, and it is stored in the frame memory 5. At the same time, it is provided via the buffer memory 14 to the signal output terminal 15 and encoded by an unillustrated coder into an arbitrary code form.

Figure 5:
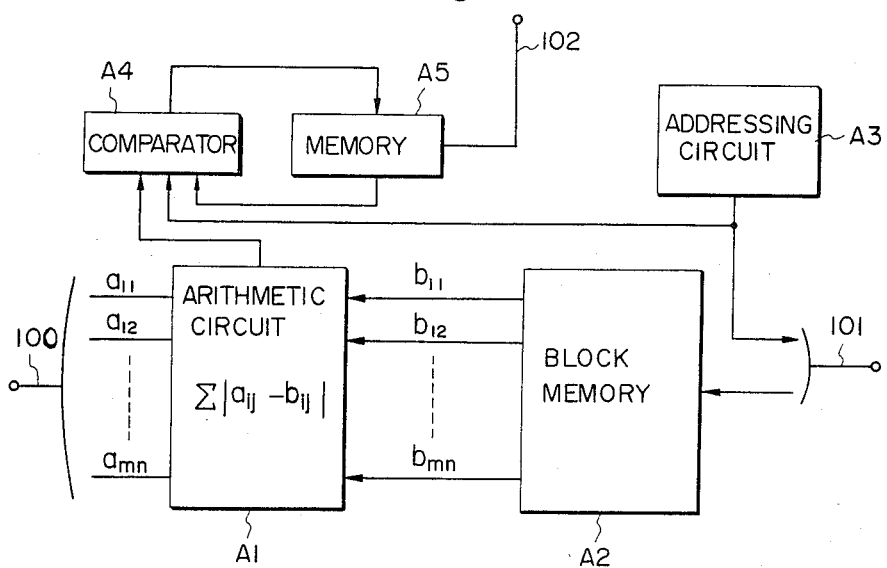

FIG. 5 shows a specific example of the movement detecting section in FIG. 4. Reference character A1 indicates an arithmetic circuit; A2 designates a block memory; A3 identifies an addressing circuit; A4 denotes a comparator; A5 represents a memory; and 100, 101 and 102 show the same lines as those in FIG. 4. In this specific example, picture elements $a_{11}, a_{12}, \ldots a_{mn}$ in the blocks of the current field delivered out from the block memory 3 and picture elements $b_{11}, b_{12}, \ldots b_{mn}$ in the blocks of the field $F_2$ stored in the block memory A2 are applied to the arithmetic circuit A1, wherein the sum of absolute values of inter-frame, intra-block difference values is calculated. The addressing circuit A3 addresses the frame memory 5 for the blocks to be stored in the block memory A2 and, upon completion of the calculation in the arithmetic circuit A1, performs another addressing. By the comparator A4 and the memory A5 is obtained an addressing value which minimizes the sum of the absolute values of the inter-frame, intra-block difference values, and this information is stored in the memory A5.

FIG. 6 illustrates a specific example of the median selecting section 9 in FIG. 4. Reference characters B1, B2 and B3 indicate level comparators; B4, B5 and B6 designate decoders; B7, B8, B9 and B13 identify OR circuits; B10, B11 and B12 denote gate circuits; and 104 and 105 represent the same lines as those in FIG. 4. First, the three prediction values sent from the intra-field predicting section 6, the inter-field predicting section 7 and the inter-frame predicting section 8 are applied to the level comparators B1, B2 and B3, wherein they are compared in terms of magnitude with one another, and information of the prediction value corresponding to the median is applied to the gate circuits B10, B11 and B12 via the decoders B4, B5 and B6 and the OR circuits B7, B8 and B9, and the prediction value corresponding to the median is obtained with the OR circuit B13.

Figure 7:
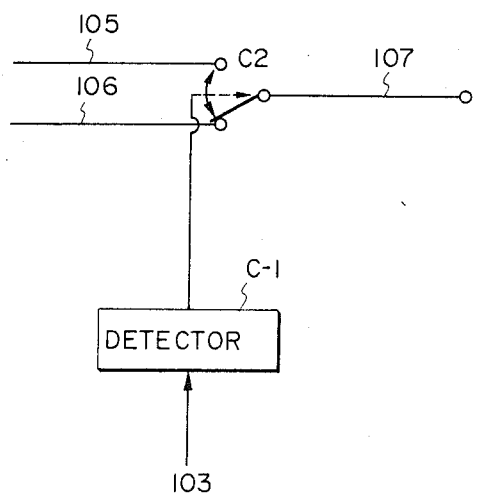

FIG. 7 illustrates a specific example of the prediction mode switching section 10 in FIG. 4. Reference character C1 indicates a detector; C2 designates a switch; and 103, 105, 106 and 107 identify the same lines as those in FIG. 4. At first, the positional information of the most approximate block from the movement detecting section 4 is tested as to whether it belongs to the standard block or the reference block, and the switch C2 is controlled in accordance with the result of the testing. The switch C2 is not changed over until all the picture element values generated from the block memory 3 are encoded.

As has been described in the foregoing, the present invention allows implementation of the coding of high prediction efficiency and excellent picture quality by the addition of the movement detecting function to the inter-frame predictive coding and elaborate adaptive control of the intra-field and inter-field prediction values in combination; accordingly, the invention can be applied to a high quality and high compression coding system for television signals.

What we claim is:

1. An adaptive predictive coding system for television signals, comprising:
    a storage section having a capacity large enough to store input television signals of at least one frame at all times;
    a blocking section for producing from the television signals a block to be coded including a plurality of picture elements;
    a movement detecting section for setting a standard block of the same shape as the block in a frame immediately preceding a current field of the block at a position spatially corresponding to the block, for reading out of the storage section picture elements included in each of reference blocks obtained by moving the standard block by at least one picture element and in the standard block and for selecting one of the reference blocks and the standard block as a most approximate block each picture element of which is most approximate in luminance to each picture element included in the block of the current field;
    an intra-field predicting section for producing a prediction value of each picture element included in the block to be coded through using picture elements present in the current field;
    an inter-field predicting section for producing a prediction value of each picture element included in the block to be coded through using picture elements present in the current field and the immediately preceding field;
    an inter-frame predicting section for producing a prediction value of each picture element included in the block to be coded through using picture elements present in the current field and the immediately preceding field and included in the most approximate block;
    a median selecting section for comparing the prediction values from the three predicting sections in terms of magnitude with one another and for selecting therefrom the prediction value assuming a median;
    a prediction mode switching section for adopting, as the prediction value of each picture element included in the block to be coded, the prediction value from the inter-frame predicting section or the prediction value from the median selecting section depending on whether the most approximate block is the standard block or the reference block; and
    a coding section for predictive-coding the block to be coded determined by the blocking section, through using the prediction value from the prediction mode switching section.

2. An adaptive predictive coding system for television signals, according to claim 1, in which the movement detecting section comprises block memory means for storing picture elements $b_{ij}$ in the blocks of the field immediately preceding the current field, an arithmetic circuit for obtaining the sum of respective obsolute values of differences between the picture elements $b_{ij}$ and the picture elements $a_{ij}$ of the blocks of the current field, and means for obtaining an addressing value which minimizes the sum as the most approximate block.

* * * * *